May 3, 1932.  E. BERGWALL  1,856,233
LAWN MOWER
Filed Nov. 27, 1929
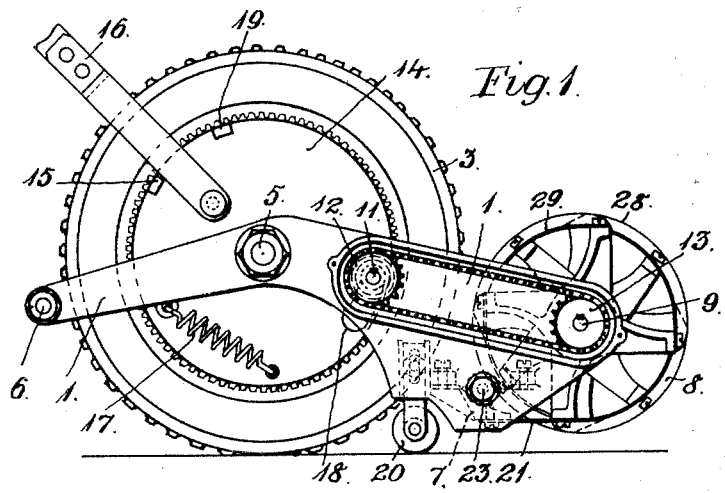
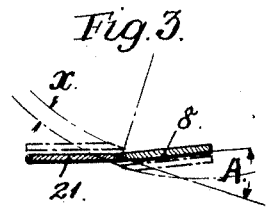
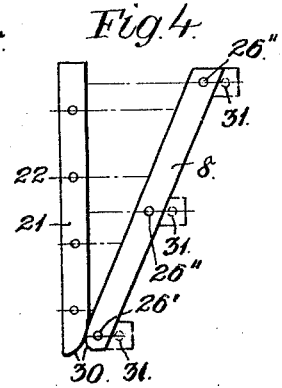
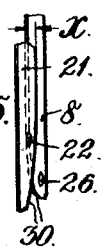
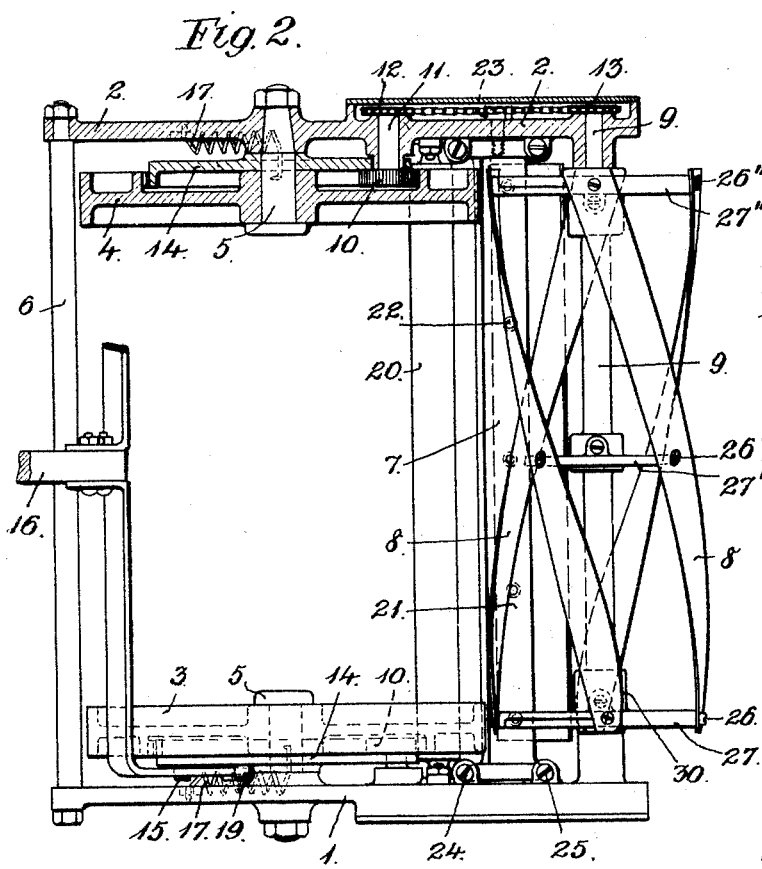
INVENTOR
Ernst Bergwall
by
Attorney Patented May 3, 1932

1,856,233

UNITED STATES PATENT OFFICE

ERNST BERGWALL, OF VARNAMO, SWEDEN

LAWN MOWER

Application filed November 27, 1929, Serial No. 410,122, and in Sweden July 7, 1927.

The present invention refers to improvements in such lawn-mowers which are provided with a fixed knife and a number of helical rotating knives contacting the fixed knife, and relates specially to such knives which are made of thin resilient material.

The object of the invention is the provision of a simplified form of and suitable fixing means for the rotating knives which by being arranged resiliently in substantially radial direction render possible a resilient contact between these knives and the fixed knife under their co-operation, so that the machine remains fully usable and in proper working order even after the knives are considerably worn out.

The invention further has for its object the provision of means in such lawn-mowers, in which the rotating knives are rotatably journalled on the machine frame in front of the driving wheels counted in the direction of travel, for preventing the front end of the machine, when moved forwards for mowing purposes, from being pressed down against the ground with such great pressure that said moving forwards is considerably aggravated.

The invention consists essentially in that a handle for operating the machine is articulated to a part rotatably arranged on the machine frame, which part is caused to abut against the frame at a position limited by said frame, by means of a spring arranged between the frame and said part. This spring is adapted, when moving down the handle, to act upon the front end of the frame to swing said end up about the axles of the driving wheels, in that the handle subjects said part to rotary motion against the action of the spring by means of an abutment on said part.

One form of embodiment of a lawn-mower according to the invention is illustrated on the accompanying drawings. Fig. 1 is a lateral view of such a machine and Fig. 2 is a sectional plan view of the machine. Fig. 3 shows a section through the co-operating knives on an enlarged scale. Fig. 4 shows the knives as projected on a plane. Fig. 5 shows the ends of the knives in co-operating relationship.

On the inside of each of two parallel, the machine frame forming frame portions 1 and 2, the driving wheels 3 and 4 are rotatably journalled on a short axle 5 fixed to the frame. Between the two frame portions which are connected with each other by means of stays 6 and further by screws at the supports 7 for the fixed knife, the rotating knives 8 are arranged on a shaft 9, both ends of which are rotatably journalled in the frame portions 1 and 2. The rotating knives are in addition executed in such lengths and otherwise so arranged, that the driving wheels 3 and 4 during the travel of the machine always rest on such portions of the lawns which previously have been mowed, that is to say, the wheels are arranged totally within the parallel planes in which the extreme ends of the knives 8 are rotating.

Driving power is transferred from the driving wheels 3 and 4 by means of two chain transmissions arranged externally on each side of the frame portions 1 and 2, for which purpose each driving wheel is provided with internal teeth which are in engagement with the teeth of a pinion 10 rotatably journalled on each of the two frame portions 1 and 2. Each of these pinions is united by means of a shaft 11 with the chain wheel 12 arranged on the outside of the frame, which chain wheel is connected by means of a chain with the chain wheel 13 fixed on either end of the knife shaft 9.

On the short axle supporting the driving wheels 3, 4, plates 14 covering the internal teeth are rotatably journalled. These covering plates are provided with projections 15, against which a handle 16 in the shape of a hoop and pivoted at said plates will rest, when the handle is moved downwardly. Between the frame portions 1 and 2 and the covering plates 14 springs 17 are inserted. The rotary motion of the plates 14 is limited at the upper side of the bearings for the pinions 10 by means of abutments which preferably consist of an aperture 18 or the like arranged in each of the plates. For limiting the motion of the handle 16 upwards the covering plates are further provided with a projection 19 or the like.

When the machine is to be moved forwardly for carrying out mowing operation the handle 16 is first swung down to rest against the projection 15, whereby the covering plates are moved about the axles 5 for the driving wheels. The rotary motion of the plates is transferred by means of the springs 17 to the machine frame, the front end of which being swung upwardly, so that the rotating knives together with the supporting roller 20 of the machine are lifted from the ground. As the machine, however, is pushed forwards, the internal teeth cause, by their rotation, the pinions 10 to be moved down, whereby the frame against the action of the springs 17 is moved downwardly against the ground, until this motion is limited by the roller 20 fixed to the frame. If under such conditions the travel of the machine in forward direction is interrupted or if the machine is moved in opposite direction, the rotating knives 8 will be maintained, by means of the springs 17, at such a height which corresponds to the position of the handle 16 which this is occupying at the occasion in question. If on the other hand, the handle 16 is released or is moved upwardly, the springs 17 will move the frame together with the rotating knives back into their normal position, whereupon the handle may be moved further upwardly to rest against the projections 19, when the machine is out of use.

By giving the springs 17 adequate tension the object contemplated by the invention is achieved, because the springs will, on account of the manner in which they are arranged, effectively counteract the tendency of the machine to swing with its rear part upwardly about the roller 20 during mowing operation. It is obvious, that the object in view could be achieved, also if the springs should be so weak, that the front end of the frame together with the rotating knives and the supporting rollers will not be lifted up, when the handle is swung down to rest against the projections 15, the chief object being that necessary power is obtained to counteract the pressing down of the machine against the ground.

The knives co-operating with each other, that is to say the fixed knife 21 and also the rotating knives 8, consist of flat bands of thin resilient material, the fixed knife 21 being fastened by means of screws 22 to the knife supporting device 7 which for the purpose of holding together the frame portions 1 and 2 are provided at their ends with screws 23, about which the knife and the knife support may be adjusted by means of screws 24 and 25 in relation to the rotating knives 8 journalled by means of the shaft 9 in the frame, so that the cutting edge of the fixed knife will resiliently contact the cutting edges forming edges of the rotating knives. The fixed knife which is fastened adjacent its one edge will then at each point of its cutting edge be resilient in substantially the same degree, because the resiliency takes place substantially in transversal direction of the knife.

The rotating knives 8 which prior to their being positioned in their proper places consist of bands having straight, evenly extending edges, are fixed by means of screws 26, 26' and 26'' to three wheel centers 27, 27' and 27'' fixed to the shaft 9, which wheel centers are so arranged that the originally flat knives, when fixed to their places, attain helical form, the cutting edges being positioned in or near to a cylindrical surface 28, while the opposite edge of the knife band is positioned on a cylindrical surface 29 lying concentrically within the first named cylindrical surface 28. By this means each knife will be so positioned that its flat side in cross-section forms an angle with a tangent passing through the cutting edge, which angle preferably should be less than 30 degrees, in order that the knives substantially may be resilient in radial direction. The pitch of the knives is preferably made dependent on the length of the knives in such a manner, that one of the knives 8 during its rotation does not leave the knife 21, before the succeeding knife has already come in contact with the knife 21. For four rotating knives the pitch, therefore, ought preferably not to be greater than four times the axial distance between the ends of the knives. In order to accomplish the desired deformation, when clamping the knives to the wheel centers, the knife bands should be of relatively small width, and therefore the fixing points should be positioned centrally between the longitudinal edges of the knife band. The knives will thereby be substantially resilient in longitudinal direction only between said fixing points, because the bending in transversal direction, especially in the neighbourhood of the fixing points, must be very inconsiderable. The rotating knives are therefore to be considered as rigid at these points, while the bending down which occurs in substantially radial direction with respect to the rotating shaft, must be greatest at the central portion between said fixing points. In the co-operation of the knives one with the other the thin resilient cutting edges will give way for each other at the contacting points, so that a wave motion proceeding along both edges will be produced. This wave motion will vary in the embodiment of the invention as illustrated, so that the bending of the fixed knife will be greatest at the contacting points in the neighbourhood of the fixing points of the rotating knives and least centrally between said fixing points. The wave motion on the rotating knives will in a corresponding manner vary, but in opposite direction, with exception, of course, at the fixing points.

Each one of the rotating knives is fixed, according to the illustrations, at three points to the three wheel centers, but several more fixing points may be arranged by providing further wheel centers. The fixing points situated between the outermost fixing points 26 and 26" may then be constituted by supporting points only for the knife band, so that the corresponding screws 26' may be omitted. In this case suitable arrangements for preventing the bands from gliding in their transversal directions should be provided for at said supporting points. Also the fixing screws at the ends may be omitted and replaced by some other means, preferably consisting of clasps or the like which engage or surround the knife band. The resiliency of the band may then be utilized for fixing the band in its proper position. When the screws are omitted, the knives will be easily exchangeable without the necessity of using such tools which are required, when the fixing is effected by means of screws or the like.

In order that the rotating knives 8 may be properly caught by the fixed knife 21, the forward ends of the rotating knives and preferably also one end of the fixed knife 21 are chamfered, in a manner as clearly illustrated in Figs. 4 and 5. When the cutting edges are formed in the manner just described, which may be accomplished in a simple manner simultaneously with cutting the bands to proper lengths, the advantage is gained that the whole length of the knife band is completely utilized, because the chamfered portion will also bring about a mowing action in cooperation with the chamfered portion of the fixed knife.

In addition to the advantage that the mowing always and at each point may be effected with a suitable contact pressure between the cutting edges of the knives, the further advantage is gained that in the embodiment as shown an adjustment of the fixed knife by means of the screws 24 and 25 is very seldom required, because the cutting edges of the rotating knives may be permitted to depart to a certain extent from the cylindrical surface 28 at the supporting points of the knives and also at points between the same. For this reason it will not be necessary to exactly set the rotating knives in proper position, so that all of them effect to the same degree the mowing action in conjunction with the fixed knife, because their elasticity renders possible that they closely follow the shape of the fixed knife, even if the setting is not exactly adjusted. Also in the case the fixed knife should depart from its intended form on account of damages or unsuitable grinding, the thin rotating knives can each per se follow the cutting edge of the fixed knife, so that the mowing also in such a case gives a good result. Further, special exactness is not required for the same reason in producing or grinding the rotating knives.

A machine executed according to the invention has the special feature that it is easily running which depends upon the fact that a counter pressure between the knives at the mowing operation can be small, because the bending of the knives is not only adhering to the fixed knife but is also present in the swinging knives. As the knives are thin, they hold themselves sharp and on account thereof they need never be ground.

Also the fixed knife may be arranged in the above described manner, such as clearly shown in Fig. 4 which shows a rotating knife 8 projected on a plane at that point in which the forward corner of the knife is caught by the fixed knife 21, if the fixing points 22 for the fixed knife are situated in other planes passing vertically in relation to the rotating shaft than those, in which the fixing points 26, 26' and 26" for the rotating knives are situated. By this means is obtained that in each contacting point a resilient contacting between the knives is accomplished, also at the rigid fixing points of respective knife. The ends of the fixed knife 21 can give way in longitudinal direction on account of the fact that the outermost fixing points of the knife are situated at a certain distance from the ends thereof. For catching the rotating knives the corners of the ends of both knives are provided with chamferings 30 so arranged that a mowing action between the knives also is effected at said chamferings. It is obvious that the same action may be obtained, even if one of said chamferings should be omitted.

Fig. 3 shows in a sectional view the position of the coacting knives in relation to each other. The full lines show a position during mowing action and the dash-dotted lines show a position of the knives they occupy prior to their cooperation with each other. The amount of bending $x$ of the knives, which thereby arises and which in Fig. 3 is shown as occurring uniformly on both knives, will according to the above statements be distributed differently on the knives, when they cooperate with each other. As disclosed in Fig. 3 the coacting cutting edges will, by wearing, very soon attain a marked cutting edge form, which circumstance is of considerable advantage, because the knives will during their use automatically hold themselves very sharp. By arranging the rotating knife in such a manner that its flat side relatively a tangent forms an angle A which is small, in any case less than 30 degrees, it is rendered possible that this knife, although thin, possesses great strength to overcome the strains arising at the mowing operation.

Fig. 5 shows in a plane vertical to the cylinder surface a front view of a swinging knife at that moment, when its forward corner is caught by the fixed knife by means of the chamferings 30. The figure clearly discloses the total amount of bending $x$ of the knives, necessary for the cooperation of the knives.

According to the illustrations the fixed knife has been made resilient. For the application of the invention this, however, is not necessary, if the fixing points of the rotating knives are not arranged at the center portion of the band but at the edge of the band, opposite to the cutting edge. In such a case, necessary bending may be obtained also at said points, if the knife band at the said places is given such a width that a bending down can also occur in the transversal direction of the band. In Fig. 4 there are shown by means of dash-dotted lines as at 31, fixing points arranged in the above stated manner and applied to a rotating knife 8. A similar arrangement may of course also be applied to the fixed knife.

It is obvious that the devices as described may be varied in maintaining the essential features with regard to the arrangement of the rotating knives in relation to the driving wheels, and that certain details may be subjected to greater or less modifications with respect to the construction which according to circumstances may give varying results, without thereby departing from the spirit of the invention and the purpose contemplated thereby.

To this end the driving power may instead of being transferred by means of the chain and toothed wheel transmission be transferred from the driving wheels to the shaft of the rotating knives by means of cylindrical or conical toothed gearings arranged at either end of shafts positioned between the axles for the driving wheels and the shaft of the rotating knives. Such transmissions are in a like manner as those previously described adapted to be dust-tightly enclosed within the machine frame.

Both the longitudinal edges of the knife band may also have a different shape than that shown. Thus, for instance, the edges on both of the co-operating knives or on one of them may depart from the straight contour or from the helical contour having constant pitch. The fixed knife or the swinging knives or all of them may also be provided with indented or toothed edges.

What I claim is:—

1. A lawn-mower having rotating knives arranged in front of driving wheels in the direction of travel for mowing purposes, comprising a handle for moving the machine forwards which is articulated to a part rotatably arranged on the machine frame, which part is caused to abut against said frame, at a position limited by said frame, by means of one or more springs arranged between the frame and said part, said springs being adapted, when moving down the handle, to act upon the front end of the frame to swing said end up about the axle of the driving wheels, so that said handle subjects said part to a rotary motion against the action of said springs by means of an abutment on said part.

2. A lawn-mower according to claim 1, comprising two chain-transmissions, each operatively connected with its own toothed gearing consisting of a driving wheel having internal teeth in engagement with a pinion, and a plate formed by the part rotatably arranged on the frame to protect said internal teeth.

ERNST BERGWALL.